United States Patent [19]

Graham et al.

[11] 4,180,552
[45] Dec. 25, 1979

[54] PROCESS FOR HYDROGEN RECOVERY FROM AMMONIA PURGE GASES

[75] Inventors: Tommy E. Graham; Donald L. MacLean, both of Raleigh, N.C.

[73] Assignee: Monsanto Company, St. Louis, Mo.

[21] Appl. No.: 888,103

[22] Filed: Mar. 20, 1978

[51] Int. Cl.$^2$ .............................................. C01C 1/04
[52] U.S. Cl. ....................................... 423/359; 55/16
[58] Field of Search ............... 423/359, 360, 361, 362, 423/363; 55/16, 158

[56] References Cited

U.S. PATENT DOCUMENTS 3,675,434  7/1972  Crawford et al. ..................... 62/23
4,058,589  11/1977  Haslam ................................. 423/359

FOREIGN PATENT DOCUMENTS 105429  4/1974  Fed. Rep. of Germany ........... 423/359

OTHER PUBLICATIONS

Baichtok et al., Membran Tekhnol–Novoe Napravlenie Nauke Tekh, 1973.
Gardner et al., Hollow Fiber Permeator for Separating Gases, Chem. Eng. Prog., 10/77, pp. 76–78.
Brubaker et al., Separation of Gases by Plastic Membranes, I & EC, vol. 46, No. 4, pp. 731–739, 1954.
Hwang et al., Operating Lines in Cascade Separation of Binary Mixtures, Can. J. of Chem. Eng., 1965, pp. 36–39.

*Primary Examiner*—O. R. Vertiz
*Assistant Examiner*—Thomas W. Roy
*Attorney, Agent, or Firm*—Norman L. Balmer; Howard C. Stanley; James W. Williams, Jr.

[57] ABSTRACT

Ammonia synthesis processes are disclosed which provide enhanced recovery of hydrogen from ammonia synthesis purge streams by selective permeation. The enhanced recovery of hydrogen can provide increased conversion of hydrogen values to ammonia. In the processes, a purge stream from an ammonia synthesis loop at a superatmospheric pressure is passed to at least two permeator stages in series. Each permeator stage contains a separation membrane which exhibits selective permeation of hydrogen as compared to the permeation of each of methane and argon. A total pressure differential is maintained across the thickness of the separation membrane to provide a driving force for the permeation of hydrogen across the separation membrane of each of the permeator stages. Hydrogen permeates through the membrane, and a hydrogen-rich permeating gas is obtained on a permeate exit side of each of the permeator stages. The permeating gas from each of the permeator stages is recycled to the ammonia synthesis reaction zone. Between permeator stages, the non-permeating gas from one permeator stage is passed to the feed side of the next permeator stage.

17 Claims, 5 Drawing Figures

PROCESS FOR HYDROGEN RECOVERY FROM AMMONIA PURGE GASES

This invention relates to processes for synthesizing ammonia from nitrogen and hydrogen, and particularly to ammonia synthesis processes in which hydrogen is recovered from an ammonia synthesis loop purge stream by selective permeation through membranes and recycled for use in the ammonia synthesis reaction.

By this invention, there are provided processes for the synthesis of ammonia from nitrogen and hydrogen which processes are characterized by enhanced conversion of hydrogen values to ammonia. In accordance with the processes of this invention, the enhanced hydrogen conversion can be achieved even when process equipment design limitations do not permit an increase in the amount of ammonia produced; however, often increased ammonia production can be obtained. The enhanced conversion of hydrogen which can be achieved by the processes of this invention involve little additional energy consumption over similar ammonia processes which do not have the enhanced hydrogen conversion, and often the energy consumption per unit of ammonia product produced is decreased. Additionally, purge gases from the processes of this invention are at high pressure and provide a valuable source of energy. Moreover, the enhanced hydrogen conversion provided by the ammonia synthesis processes of this invention can be achieved without undue deleterious effects on the ammonia synthesis process equipment. Furthermore, prior ammonia synthesis processes can facilely be modified to provide ammonia synthesis processes in accordance with this invention. Advantageously, if desired, the enhanced conversion of hydrogen to ammonia in these modified prior ammonia synthesis processes can be achieved with the use of conventional operating conditions of the ammonia synthesis reaction zone thereby minimizing operational changes due to the modification.

Ammonia is synthesized by the catalytic reaction of hydrogen and nitrogen. The hydrogen feedstock for the ammonia synthesis is generally obtained from primary reforming of hydrocarbon, e.g., natural gas. The effluent from the primary reforming thus contains impurities such as methane, carbon oxides, i.e., carbon dioxide and carbon monoxide, water and the like. Current practice provides for the removal of impurities from the reformer effluent which may be harmful to the ammonia synthesis catalyst such as the carbon oxides, sulfur compounds and the like; however, impurities such as methane are generally not completely removed from the reformer effluent since they are not directly harmful to the ammonia synthesis reaction and are expensive to remove. The nitrogen feedstock is usually obtained from air with the removal of oxygen, e.g., by combustion with fuel to produce water or carbon dioxide and water, followed by removal of the water and carbon dioxide, if present, or by liquifaction. The resultant nitrogen stream contains minor amounts of impurities such as argon which are present in small amounts in air. Since they are not directly harmful to the ammonia synthesis reaction, these impurities are not generally removed from the nitrogen feedstock due to economic considerations.

The hydrogen feedstock and nitrogen feedstock are combined in essentially stoichiometric amounts to provide a feed gas for producing ammonia, and the feed gas is compressed to ammonia synthesis pressures, e.g., superatmospheric pressures of often at least about 100 atmospheres absolute. The compressed feed gas is contacted with an ammonia synthesis catalyst such as a promoted iron catalyst in an ammonia synthesis reaction zone. The ammonia synthesis reaction is an equilibrium reaction and is exothermic. In some processes temperatures greater than about 600° C. may be produced. Generally, the conversion to ammonia based on hydrogen fed to the synthesis reaction zone is less than about 30 percent, and is frequently less than 20 percent. Thus the reaction effluent from the ammonia synthesis reaction zone contains substantial amounts of hydrogen and nitrogen. Accordingly, ammonia is condensed from the reaction effluent, and the reaction effluent containing the valuable hydrogen is recycled in an ammonia synthesis loop to the ammonia synthesis reaction zone to provide an attractive conversion of hydrogen in the feed to ammonia. Difficulties occur in that the inert contaminants such as methane, argon, etc., in the hydrogen and nitrogen feedstocks do not take part in the ammonia synthesis reaction and must be removed from the ammonia synthesis loop in an amount sufficient to prevent an undue build-up of these inert contaminants in the ammonia synthesis loop. Conveniently, the removal of these inert contaminants is effected by removing a purge stream from the ammonia synthesis loop. The purge stream will contain the same concentration of hydrogen and nitrogen as the recycling reaction effluent. Hence, recovery of the valuable hydrogen from the purge stream for return to the ammonia synthesis catalyst zone may be highly desirable.

Ammonia synthesis processes which are of commercial interest are complex and integrated with the steps in the processes being highly interacting to maximize ammonia production on an economically attractive basis. Thus changes in one step of the process may affect other steps in the process as well as the overall economics, including capital expenditures and operating expenditures, of an ammonia synthesis plant.

Proposals for recovery of hydrogen from ammonia synthesis purge streams have included the use of cryogenic recovery systems. More recent proposals for cryogenic hydrogen recovery systems for treating purge streams have emphasized reducing operating costs especially with respect to energy consumption in cooling and the selective removal of helium from hydrogen using cryogenic processes. See, for instance, Haslam in U.S. Pat. No. 4,058,589, issued Nov. 15, 1977 (see also Haslam, et al, "Recycle $H_2$ in $NH_3$ Purge Gas", *Hydrocarbon Processing*, Jan. 1976, pp. 103–106) and Crawford, et al, U.S. Pat. No. 3,675,434, issued July 11, 1972. Generally, the purge stream from cryogenic hydrogen recovery systems is low pressure and hence its energy content has been significantly depleted. Although cryogenic recovery of hydrogen from ammonia synthesis purge streams has long been suggested, its adoption has been limited due to the high capital costs of cryogenic recovery systems and limited savings which could be appreciated in using the systems.

Due to the sizeable capital costs of cryogenic hydrogen recovery systems, alternative methods for separating hydrogen from inert contaminants such as methane and argon are sought. One method which has achieved limited interest is the use of separation membranes which exhibit selective permeation.

Gardner, et al, in "Hollow Fiber Permeator for Separating Gases", *Chemical Engineering Progress*, October 1977, pages 76 to 78, suggest that one application for separation membranes is in treating an ammonia synthesis purge stream to recover hydrogen. This article reports the substance of a paper presented at the meeting of the American Institute of Chemical Engineers on about Mar. 21, 1977. The authors suggest several benefits which might be achieved through hydrogen recovery using separation membranes; however, the simplified flow diagrams and descriptions which are presented essentially provide only that membranes might be useful in an ammonia synthesis system without any of the specifics which are necessary in order to provide an operable, efficient ammonia synthesis system.

Many factors are involved in providing an operable, efficient ammonia synthesis process in which separation membranes are employed to recover hydrogen from the purge stream, for instance, the nature and relative concentrations of the components in the purge stream contacting the membrane, the total pressures of the permeating and non-permeating gases from the membrane, the conditions of the process stream in which the recovered hydrogen is reintroduced into the ammonia synthesis system, the nature of the gases with which the hydrogen-rich gases are combined and the like. Specifically, Gardner, et al, disclose an ammonia synthesis system in which the purge stream is reduced in pressure from about 1900 pounds per square inch gauge (psig) (about 130 atmospheres absolute) to about 1000 psig (about 69 atmospheres absolute) and passed through the bores of 7 hollow fiber-containing permeators. A further 100 psi (6.8 atmospheres) pressure loss in the purge stream is incurred. A hydrogen-rich permeate is obtained from the shell side of the permeators at a pressure of 400 psig (about 28 atmospheres absolute), and the permeate is combined with the feed at 400 psig (about 28 atmospheres absolute) and recompressed to the ammonia synthesis pressure. Accordingly, even though only a 34 to 40 atmosphere pressure differential occurs across the membrane, the expense of recompressing the permeate to over 130 atmospheres absolute must be borne.

In copending U. S. application of Eli Perry, Ser. No. 888,101, filed concurrently herewith, and Eli Perry and Harold R. Null, Ser. No. 888,256, filed concurrently herewith, and Eli Perry, Harold R. Null, and Charles E. Prince, Ser. No. 888,255, filed concurrently herewith, all of which are incorporated by reference, novel processes are provided for the synthesis of ammonia in which processes, hydrogen is recovered from purge streams employing selective permeation and is recycled to the ammonia synthesis reaction zone. These novel processes provide operable, efficient ammonia synthesis systems in which the recycling of permeated hydrogen is highly integrated and interacts with the ammonia synthesis system to maximize ammonia production on an economically attractive basis.

In accordance with the processes of this invention the purge stream from an ammonia synthesis loop is passed to at least two permeator stages in series. Each of the permeator stages contain a separation membrane having a feed side and a permeate exit side and exhibiting selectivity to the permeability of hydrogen as compared to the permeability of each of methane and argon. A total pressure differential is maintained across the separation membrane to provide the driving force to effect the desired permeation of hydrogen. Between permeator stages, the non-permeating gas from the feed side of the separation membrane of one permeator stage is passed to the feed side of the separation membrane of the next permeator stage. In the processes of this invention, the ratio of total pressure on the feed side to the total pressure on the permeate exit side of the separation membrane for at least one permeator stage (hereinafter low total pressure ratio permeator stage) is less than the ratio of total pressure on the feed side to the total pressure on the permeate exit side of the separation membrane for at least one subsequent, i.e., downstream, permeator stage (hereinafter high total pressure ratio permeator stage). The permeating gas from at least one permeator stage is recycled to the ammonia synthesis reaction zone.

The at least two permeator stages of this invention provide significant advantages in that at least one low total pressure ratio permeator stage separates hydrogen from the purge stream while enabling the permeating gas from that stage to be at a suitable total pressure for recycling to the ammonia synthesis reaction zone without undue recompression. The non-permeating gas from the at least one low total pressure ratio permeator stage is passed to at least one high total pressure ratio permeator stage in which additional hydrogen is separated. Although the permeating gas from this permeator stage may be at a lower total pressure than that of the permeating gas from the at least one low total pressure ratio permeator stage, the weight amount of permeating gas which requires additional recompression is only a portion of the permeating gases from all of the permeator stages. Thus, less recompression is required than if all of the permeating gases were at the lower total pressure. By the use of the process of this invention, it is possible to enhance hydrogen recovery from ammonia synthesis purge streams without unduly increasing permeating gas recompression costs. Moreover, the total effective separating membrane area for a given hydrogen recovery is reduced using the processes of this invention in comparison to the total effective membrane area required for the given hydrogen recovery if only low total pressure ratio permeators in parallel flow relationship were employed.

According to current theory, the rate at which a moiety permeates through a separation membrane is dependent in part on the driving force for that moiety. With respect to membrane separations in which the moiety is gaseous and passes from a feed gas mixture to a permeating gas on the exit side of the membrane, the driving force is the differential in fugacity for that moiety. Generally, fugacities for ideal gases are approximated by partial pressures and thus, conventionally, in gas separations, the driving force is referred to in terms of partial pressure differentials. The partial pressure of a moiety in a gas mixture can be defined as the concentration of the moiety in the gas mixture on a molecular basis times the total pressure of the gas mixture. Often, the concentration of the moiety on a molecular basis is approximated by the volume concentration of the moiety. In view of the effect of the concentration of the moiety in the gas and the total pressure of the gas on the partial pressure, these parameters can be varied jointly or separately to provide suitable partial pressure differentials across the membrane to provide desirable fluxes of the moiety. For instance, with the moiety concentrations on the feed side and on the permeate exit side and the total pressure differential across the membrane remaining constant, but varying the total pressures on the feed and permeate exit sides, a greater partial pressure differential of the moiety is provided at lower total pressures on the feed side and permeate exit side of a membrane.

Thus, in accordance with this invention, the at least one low total pressure ratio permeator stage can be operated such that a suitable partial pressure differential for hydrogen is maintained across the separation membrane to provide, for instance, a permeating gas containing up to about 70 percent of the hydrogen in the purge stream wherein the permeating gas is substantially at a suitable total pressure for being recycled to the ammonia synthesis zone without requiring undue recompression. In a preferred aspect of the invention, the total pressure of the purge stream fed to the permeator is at least substantially the superatmospheric synthesis pressure, e.g., the total pressure is at least above about 20 atmospheres below the superatmospheric synthesis pressure. In certain instances, it may be desirable to compress the purge stream such that the permeating gas from this permeator stage is at a total pressure suitable for direct reintroduction into the ammonia synthesis loop. In such instances, the purge stream may often be compressed to at least about 20 atmospheres above, say, about 25 to 100 atmospheres above, the superatmospheric synthesis pressure.

It is clear that the non-permeating gas from the low total pressure ratio permeator stage will contain substantial amounts of hydrogen, for instance, at least about 20 percent of the hydrogen in the purge stream. While additional hydrogen can often be recovered, in the low total pressure ratio permeator stage, e.g., by increasing the effective separation membrane area, it is preferred that this permeator stage not be operated to maximize its hydrogen recovery. Rather, this permeator stage is preferably operated predominantly on a flux-limiting basis. In a flux-limiting basis operation, the separation is conducted under conditions such that when the flux through the membrane significantly decreases, the separation operation is terminated, e.g., by passing the non-permeating gas from the permeator. Flux-limiting basis operations are in contrast to unwanted permeate-limiting basis operations. In unwanted permeate-limiting basis operations, the separation is continued to provide a suitable recovery of a high proportion of the moiety from the feed mixture without undue permeation of the undesired moities in the feed mixture. Generally, in any commercially practical membrane separation operation, both flux-limiting basis and unwanted permeate-limiting basis considerations will be involved. Often, in a predominantly flux-limiting mode of operation, it is desired that the percent of the difference in hydrogen partial pressures between the feed gas (ppH$_2$ feed) and the non-permeating gas (ppH$_2$ non-permeating) divided by the difference between the hydrogen partial pressure of the feed gas and the minimum hydrogen partial pressure on the permeate exit side of the membrane (ppH$_2$ permeate min.) is up to about 90, say, about 20 or 30 to 90, often about 30 to 85. On the other hand, in a predominantly unwanted permeate-limiting basis mode of operation, this relationship will often be at least about 85 or 90 percent.

As stated above, the low total pressure ratio permeator stage is preferably operated on a predominantly flux-limiting basis in order to provide a hydrogen-rich permeating gas at a desirable total pressure. For a given total pressure differential across the separation membrane and a given separation membrane, a high purge stream flow rate per unit of available membrane surface area can be employed and a greater amount of hydrogen permeates the membrane per unit area per unit time than if the permeator stage were operated on an unwanted permeate-limiting basis. Generally, sufficient membrane area is provided in the low total pressure ratio permeator stages to permeate at least about 20, preferably about 30 to 70, percent of the hydrogen in the purge stream.

Since the low total pressure ratio permeator stages are preferably flux limited, particularly desirable separation membranes exhibit high permeabilities for the permeation of hydrogen, but need not exhibit as high a selectivity to the permeability of hydrogen as compared to the permeability of each of methane and argon as the selectivity required of a membrane in a predominantly unwanted permeate-limited mode of operation or if the separation were conducted in a single permeator stage in order to provide an advantageous ammonia synthesis system.

The non-permeating gas from the at least one low total pressure ratio permeator stage is passed to the feed side of at least one high total pressure ratio permeator stage to recover additional hydrogen. The amount of hydrogen in the permeating gas from this permeator stage is frequently at least about 10, say, at least about 15 percent of the amount of hydrogen in the purge stream. The amount of hydrogen in the total permeating gas from all of the permeator stages is preferably at least about 50, e.g., at least about 60, say, about 60 to 95, percent of the hydrogen in the purge stream.

The at least one high total pressure ratio permeator stage can be operated on a predominantly flux-limited basis or a predominantly unwanted permeate-limited basis.

The gas fed to the high total pressure ratio permeator stage can be at any suitable total pressure. For instance, the non-permeating gas from the low total pressure ratio permeator stage can be compressed or decompressed, or can remain at substantially the same pressure depending upon the desired total pressure differential across the separation membrane, the total pressure of the permeating gas, and the like. Often, due to strengths obtainable in some suitable separation membranes, the total pressure of the gas fed to the high total pressure ratio permeator stage is decompressed to enable achieving a desirable total pressure differential across the membrane. In an advantageous aspect of this invention, the total pressure of the permeating gas from the high total pressure ratio permeator stage is sufficient to enable its introduction into the ammonia synthesis system and be recycled to the ammonia synthesis reaction zone without undue recompression.

The ratio of the total pressure on the feed side to the total pressure on the permeate exit side of the at least one low total pressure ratio permeator stage is less than that ratio for the at least one high total pressure ratio permeator stage. Often, the total pressure ratio of at least one low total pressure ratio permeator stage is at least about 10 or 15, say, about 15 to 99, preferably, about 20 to 95, percent less than the total pressure ratio of at least one high total pressure ratio permeator stage. Generally the total pressure drop across at least one high total pressure ratio permeator stage is within about 10 to 500, say, about 15 to 250, percent of the total pressure drop across at least one low total pressure ratio permeator stage.

Any suitable number of permeator stages may be employed so long as at least one low total pressure ratio permeator stage and at least one high total pressure ratio permeator stage are provided. Each permeator stage may be comprised of one or more separate permeators wherein plural permeators are arranged in substantially parallel flow relationships. Preferably, the first permeator stage is a low total pressure ratio permeator stage. Often, the last permeator stage is a high total pressure ratio permeator stage. Most frequently, two permeator stages are utilized; however, in some instances three or more permeator stages may be desirable. Generally, little benefit is achieved in the use of permeator stages above about five. Preferably, if any permeator stage is operated on a predominantly unwanted permeate-limiting basis, that permeator stage is the last permeator stage.

The effective membrane surface area (i.e., the membrane area available to effect separation) for each permeator stage should be sufficient to allow a desired amount of hydrogen to permeate. The amount of effective membrane surface area to be employed is influenced by, for instance, the permeation rate of hydrogen through the membrane under the separation conditions, i.e., temperature, absolute pressure, total pressure differential across the membrane, and partial pressure differentials of hydrogen across the membrane. Advantageous pressure differentials across separation membranes are at least about 10, say, at least about 20, atmospheres. However, the pressure differential should not be so great as to unduly stress the membranes such that it ruptures or is prone to easily rupturing.

The volume ratio of the permeating to non-permeating gases from each of the permeator stages as well as the composition of each of the permeating and non-permeating gases which may be employed in accordance with the method of this invention can be varied over a wide range. By way of illustration, Table I provides typical approximate concentrations of the significant components in the gases passed to a low total pressure ratio permeation stage and to a high total pressure ratio permeator stage and those in the permeating and non-permeating gases from each stage.

The stream into which a permeating gas is introduced can be selected partially on the basis of the operating pressure differentials across the separation membrane which can be employed. Since the compression of the synthesis feed gas is conducted in several stages, or steps, some limitation exists as to the pressure differentials across the membrane which are available in a given ammonia synthesis system, especially in ammonia synthesis systems which are retrofitted with separation membrane hydrogen recovery systems to enable conducting the ammonia synthesis processes of this invention. The processes of this invention, however, are sufficiently flexible, since the separation of hydrogen is conducted in a plurality of permeator stages, that a permeating gas stream having a desirable total pressure can be provided. In general, the pressure differential for a given ammonia synthesis system in accordance with this invention is selected to provide the largest operating total pressure differential across the separation membrane (within the range of suitable operating pressure differentials for a given separation membrane) which provides a permeating gas at a suitable pressure for introduction into a synthesis feed gas stream. Usually, the permeating gas is at a slightly higher pressure than the gas stream into which it is introduced, e.g., about 0.1 to 5 atmospheres higher. A reduction in the total pressure of the permeating gas or, preferably, the gas passing the permeator stage should only be employed when no suitable gas stream is available which is at a pressure which permits a suitable total pressure differential across the membrane to be achieved, e.g., the available synthesis feed gas streams are at pressures too high to permit a desired hydrogen flux through the separation membrane or at pressures so low that the separation membrane can not physically withstand the pressure differential. Alternatively, a desirable total pressure differential may be provided across the separation membrane and the permeating gas compressed to suitable pressures for introduction into, e.g., the synthesis feed gas stream or synthesis loop, or the purge

TABLE I

| Component | To Membrane | | Permeating Gas | | Non-Permeating Gas | |
|---|---|---|---|---|---|---|
| | General | Preferred | General | Preferred | General | Preferred |
| Low Total Pressure Ratio Permeator Stage | | | | | | |
| Hydrogen | 50–70 | 57–69 | 80-substantially 100 | 80–98 | 20–60 | 20–50 |
| Nitrogen | 13–24 | 19–23 | Trace-15 | Trace-13 | 20–50 | 30–50 |
| Argon | 2–6 | 3–5 | Trace-5 | Trace-2 | 2–12 | 4–12 |
| Methane | 4–20 | 6–15 | Trace-5 | Trace-2 | 5–30 | 12–30 |
| Helium | 0–15 | 0–5 | 0–10 | 0–3 | 0–5 | 0–2 |
| High Total Pressure Ratio Permeator Stage | | | | | | |
| Hydrogen | 10–60 | 10–50 | 60-substantially 100 | 65–95 | 10–40 | 10–35 |
| Nitrogen | 20–60 | 30–60 | Trace-20 | Trace-15 | 20–70 | 30–60 |
| Argon | 2–15 | 4–12 | Trace-7 | Trace-3 | 2–20 | 4–25 |
| Methane | 5–35 | 12–30 | Trace-7 | Trace-3 | 7–35 | 15–30 |
| Helium | 0–5 | 0–2 | 0–10 | 0–5 | 0–5 | 0–2 |

The permeating gas from each of the permeator stages contains valuable hydrogen and can be recycled such that the hydrogen can be utilized in the ammonia synthesis. In accordance with the processes of this invention the total pressure under which the permeating gas exits each permeator stage is taken advantage of, for instance, by returning the permeating gas to the synthesis feed gas at a point where the permeating gas is at substantially the same pressure as the synthesis gas. Thus recompression costs are minimized.

stream may be compressed prior to contacting the separation membrane to provide a desired pressure differential across the separation membrane and a permeating gas at a suitable pressure for reintroduction into the ammonia synthesis system.

The ammonia synthesis process is described in more detail in order that this invention can be fully appreciated. The predominant components of the synthesis feed gas are hydrogen and nitrogen. At least one of methane and argon are present as contaminants in the synthesis feed gas. Methane is often present in amounts of up to about 5, e.g., about 0.1 to 3, volume percent, and argon is often present in amounts of up to about 0.5, e.g., about 0.1 to 0.5, most often about 0.3, volume percent based on the synthesis feed gas. Other contaminants which may be present include water and helium. The ratio of hydrogen to nitrogen which is present in the feed gas is preferably such that the mole ratio of hydrogen to nitrogen of the reaction gas introduced into the ammonia synthesis reaction zone is substantially constant to prevent a build-up of either hydrogen or nitrogen in the ammonia synthesis loop. However, the mole ratio of hydrogen to nitrogen in the reaction gas may be greater or less than the stoichiometric ratio such that the excess of hydrogen or nitrogen over that required for the reaction to ammonia on a stoichiometric basis shifts the equilibrium in favor of ammonia production. In such situations, the mole ratio of hydrogen to nitrogen may be from about 2 to 2.5:1 to about 3.5 or 4:1. Higher or lower mole ratios could be employed; however, since a purge stream must be removed from the synthesis loop to prevent undue build-up of contaminants, considerable increases in the loss of valuable nitrogen or hydrogen would be incurred. The processes of this invention do minimize the increases in loss of hydrogen through the purge stream when the reaction gas has a greater than 3:1 mole ratio of hydrogen to nitrogen because of the recovery and recycling of hydrogen from the purge stream. Generally, the mole ratio of hydrogen to nitrogen in the reaction gas is about 2.8:1 to 3.5:1, say, about 2.9:1 to 3.3:1. Frequently, the mole ratio of hydrogen to nitrogen in the reaction gas introduced into the ammonia synthesis reaction zone is substantially that mole ratio required for the reaction of hydrogen and nitrogen on a stoichiometric basis, e.g., about 2.95:1 to 3.05:1. Generally, nitrogen does not permeate the membrane to a significant extent, and the permeating gas contains little, if any, nitrogen. However, any nitrogen which is recovered and recycled in the permeating gas represents a savings with respect to the nitrogen feedstock demands. The mole ratio of hydrogen to nitrogen in the synthesis feed gas is thus usually slightly less than the mole ratio of hydrogen to nitrogen in the reaction gas such that desirable hydrogen to nitrogen ratios are provided when combined with the permeating gas which is recovered from the purge stream. In typical ammonia plants in accordance with this invention, the mole ratio of hydrogen to nitrogen in the synthesis feed gas may be about 2.7:1 to 3.2:1, say, about 2.8:1 to 3.0:1. Frequently, the reactor feed gas fed to the ammonia synthesis reaction zone contains about 0.5 to 5, say, about 1 to 4, volume percent ammonia and less than about 25 volume percent inert contaminants, say, about 4 to 15 volume percent inert contaminants. Thus, the reactor feed gas may comprise about 2 to 15 volume percent methane, about 2 to 10 volume percent argon, and helium, if present in the reformer feed, e.g., in an amount of about 0.1 to 5 volume percent.

The reaction between hydrogen and nitrogen to produce ammonia is exothermic and is an equilibrium reaction. The ammonia synthesis may be conducted using any suitable procedure such as the Haber-Bosch, modified Haber-Bosch, Fauser and Mont Cenis systems. See, the *Encyclopedia of Chemical Technology*, Second Edition, Volume 2, pages 258, et seq., herein incorporated by reference, for various of the processes for synthesizing ammonia from hydrogen and nitrogen. In general, these processes employ superatmospheric ammonia synthesis pressures of at least about 100 atmospheres absolute and promoted iron synthesis catalysts. The ammonia synthesis reaction zone is generally cooled to maintain reaction temperatures of about 150° or 200° to 600° C. The use of high synthesis pressures shifts the equilibrium in favor of the formation of ammonia. Although some ammonia synthesis pressures which have been employed are as high as 500 or more atmospheres absolute, most present day ammonia plants utilize synthesis pressures of about 100 to 300 or 350 atmospheres absolute, especially about 125 to 275 atmospheres absolute. Typically, the ammonia synthesis feed gas is compressed in at least two stages in order to facilitate achieving synthesis pressures. Generally, the pressure of the feed gas prior to at least one compression stage is within at least about 100, say, within about 10 or 20, atmospheres below the synthesis pressure. The lowest pressure in the ammonia synthesis loop is preferably within about 5 to 10 atmospheres below the synthesis pressure. A recycle compressor is generally employed to circulate the gases in the synthesis loop and to maintain the desired synthesis pressure in the ammonia synthesis reaction zone.

The conversion to ammonia based on hydrogen entering the ammonia synthesis reaction zone is often about 5 to 30, e.g., about 8 to 20 percent. In many commercial plants, the ammonia concentration of the reaction effluent exiting the ammonia synthesis reaction zone is about 10 to 25, e.g., about 10 to 15 or 20, volume percent.

Ammonia in the reaction effluent from the ammonia synthesis reaction zone is removed from the synthesis loop. A preferred method for removing the ammonia is by chilling the ammonia-containing reaction effluent to coalesce ammonia which can be removed as a liquid product. After removal of the ammonia the gas in the synthesis loop still may contain ammonia, e.g., up to about 5 volume percent ammonia. The coalescing of ammonia from the gas in the ammonia synthesis loop is preferably conducted subsequent to the recycle compression. Two or more ammonia coalescers may be employed in the synthesis loop to enhance ammonia recovery.

The compressed synthesis feed gas may be introduced into the ammonia synthesis loop at any suitable location, e.g., before or after the recycle compressor, and before or after the ammonia removal. In many instances, however, it is preferred to introduce the compressed synthesis feed gas into the ammonia synthesis loop prior to coalescing ammonia since the coalescing can remove water vapor and thus ensure that the reaction gas fed to the ammonia synthesis reaction zone has a low oxygen-containing compound content to prevent catalyst poisoning.

The purge stream is removed from the ammonia synthesis loop in order to maintain desirable concentrations of inert contaminants in the synthesis loop. Frequently, the reactor feed gas contains less than about 25, say, about 4 to 15, volume percent inert contaminants. The purge stream often comprises up to about 3, say, about 0.5 to 2.5, volume percent of the gases in the synthesis loop at the point from which the purge is taken. The purge stream may, of course, be a greater portion of the gases in the synthesis loop; however, such large purge amounts result in increases in the weight amounts of nitrogen and, possible, hydrogen exhausted from the ammonia synthesis system. The volume of the purge stream is usually sufficient to maintain the concentrations of methane and argon substantially constant.

It is generally preferred to remove the purge stream from the gases in the ammonia synthesis loop upstream of the introduction of the compressed synthesis feed gas to prevent purging the fresh hydrogen and nitrogen feed. The purge stream may be removed from the synthesis loop upstream of the ammonia removal, or the purge stream may be removed from the synthesis loop downstream of the ammonia removal from the synthesis loop. Usually the gases in the ammonia synthesis loop downstream from the ammonia removal contain reduced, but still significant, amounts of ammonia.

In the case in which the purge stream is removed from the synthesis loop upstream of the ammonia removal, the ammonia concentration in the purge stream is often at least about 5 volume percent, say, up to about 30, e.g., about 8 to 25, or even 10 L to 15 or 20, volume percent. Conveniently, the purge stream is chilled to coalesce ammonia, and the separated liquid ammonia can provide additional ammonia product. The purge stream still contains significant amounts of ammonia, e.g., often at least about 0.5 or 1 volume percent ammonia. This procedure is particularly desirable when modifying existing ammonia synthesis plants to produce ammonia in accordance with this invention since existing ammonia synthesis plants generally employ an ammonia coalescer to remove ammonia from the purge stream. The amount of ammonia in the purge stream may be further reduced by scrubbing with water or by diffusion of the ammonia through the separation membrane. Thus, the ammonia concentration of the non-permeating gas from the last permeator stage may be sufficiently low that it is suitable for use as, e.g., fuel, or can be vented to the environment, especially after recovering energy provided by the higher pressure of the purge stream. On the other hand, the purge stream may be passed to the permeator stages without removal of ammonia, or ammonia can be removed from the non-permeating gas between permeator stages, e.g., by chilling and coalescing and/or by water scrubbing.

In the case in which the purge stream is removed from the synthesis loop downstream of the ammonia removal, the ammonia concentration in the purge stream is often at least about 0.5 up to about 5 volume percent. In view of the low ammonia concentration in the purge stream, removal of ammonia from the purge stream prior to contacting the separation membrane sometimes is not done. Additional ammonia is recovered from the purge stream by permeation through the separation membrane, and the non-permeating gas from the last permeator stage may be suitable for use as, e.g., fuel or can be vented to the atmosphere, especially after recovering energy provided by the high pressure of the purge stream.

The purge stream may, if necessary, be subjected to heat exchange to provide suitable temperatures for effecting hydrogen separation by the use of separation membranes. Often, the purge stream to be contacted with the separation membrane of a permeator stage is at least about 10° C., say, about 15° to 50° C., preferably, about 25° to 40° C. Higher temperatures may be employed depending upon the physical stability and the selectivity of separation of the membrane at the higher temperatures.

The purge stream is contacted with a separation membrane which exhibits selectivity to the permeation of hydrogen as compared to the permeation of each of methane and argon. In view of the generally substantially lower volume concentrations of methane and argon in the purge stream as compared to the volume concentration of hydrogen in the purge stream, suitable separation membranes need not exhibit high selectivity of separation of hydrogen from each of methane and argon in order to provide an enhanced ammonia synthesis process. Generally, the selectivity of separation of a membrane is described in terms of the ratio of the permeability of the fast permeating gas (hydrogen) to the permeability of the slow permeating gas (methane or argon) wherein the permeability of the gas through the membrane can be defined as the volume of gas, standard temperature and pressure, which passes through a membrane per square centimeter of surface area, per second, for a partial pressure drop of 1 centimeter of mercury across the membrane. This ratio is referred to as a separation factor for the membrane. For sake of uniformity, the permeabilities and separation factors mentioned herein are determined at about 25° C. and a pressure drop of about 3,4 atmospheres across the membrane with the feed side of the membrane being about 3,4 atmospheres absolute unless otherwise indicated. Often, the separation factor of the membrane for the separation of hydrogen from methane is at least about 10. Separation factors for hydrogen over methane of 100 or greater may be provided by certain membranes; however, little advantage may be obtained using such highly selective membranes. Often the membrane may be selected on its ability to quickly permeate hydrogen rather than on its selectivity of separation. Consequently, membranes exhibiting a separation factor for hydrogen over methane of about 10 to 80 are adequate. Clearly, the higher the permeability of hydrogen through a membrane, the less available membrane surface area which is required to pass a desired amount of hydrogen through the membrane. Particularly desirable membranes exhibit hydrogen permeabilities of at least about $1 \times 10^{-6}$, preferably at least about $20 \times 10^{-6}$, cubic centimeters of hydrogen per square centimeters of membrane surface area per second at a partial pressure drop of 1 centimeter of mercury across the membrane.

A permeator containing the separation membrane may be of any suitable design for gas separations, e.g., plate and frame, or having spiral wound film membranes, tubular membranes, hollow fiber membranes, or the like. Preferably, the permeator comprises hollow fiber membranes due to the high membrane surface area per unit volume which can be obtained. When the membranes are in tubular or hollow fiber form, a plurality of the membranes can be substantially parallelly arranged in bundle form and the purge stream can be contacted with either the outside (shell side) or the inside (bore side) of the membranes. Preferably, the purge stream is contacted with the shell side of the membranes since passage of the purge stream through the bore side of the membranes may involve substantially greater pressure losses. With shell side feed, the shell side effluent from the permeator can often be at less than about 1 or 5, often within less than about 0.5, atmospheres below the pressure of the purge stream fed to the permeator. Since the concentration of hydrogen on the feed side of the membrane is continually diminishing as hydrogen permeates to the permeate exit side of the membrane which has increasing concentration of hydrogen, the hydrogen partial pressure differential across the membrane is continually changing. Therefore, flow patterns in the permeator can be utilized to provide desirable recoveries of hydrogen from the purge stream. For instance, the flows of the purge stream and the permeating gas can be concurrent or counter current. With bundles of hollow fiber and tubular membranes, the shell side feed can be radial, i.e., the feed stream transversely flows past the membranes either to the inside or, usually, the outside of the bundle, or the flow can be axial, i.e., the feed stream disperses within the bundle and generally flows in the direction in which the hollow fibers or tubular membranes are oriented.

Any suitable material may be employed for the separation membrane. Typical membrane materials include organic polymers or organic polymer mixed with inorganics, e.g., fillers, reinforcements, and the like. Metal-containing membranes may also be used. Polymers which may be suitable for the separation membranes can be substituted or unsubstituted polymers and may be selected from polysulfones; poly(styrenes), including styrene-containing copolymers such as acrylonitrile-styrene copolymers, styrene-butadiene copolymers and styrene-vinylbenzylhalide copolymers; polycarbonates; cellulosic polymers, such as cellulose acetatebutyrate, cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide) and poly(xylylene oxide); poly(ester-amide-diisocyanate); polyurethanes; polyesters (including polyarylates), such as poly(ethylene terephthalate), poly(alkyl methacrylates), poly(alkyl acrylates), poly(phenylene terephthalate), etc.; polysulfides; polymers from monomers having alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinlidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amines), poly(vinyl phosphates), and poly(vinyl sulfates); polyacetal; polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

Since the rate of permeation through a membrane is affected by the thickness of the membrane material through which a permeating material must pass, the membrane material is preferably as thin as possible yet sufficiently thick to provide adequate strength to the membrane to withstand the separation conditions. The membrane may be isotropic, i.e., has substantially the same density throughout, or may be anisotropic, i.e., has at least one zone of greater density than at least one other zone of the membrane. The membrane may be chemically homogeneous, i.e., constructed of the same material, or may be a composite membrane. Suitable composite membranes may comprise a thin layer which effects the separation on a porous physical support which provides the necessary strength to the membrane to withstand membrane separation conditions. Other suitable composite membranes are the multicomponent membranes disclosed by Henis, et al, in U.S. patent application Ser. No. 832,481, filed Sept. 13, 1977, herein incorporated by reference. These membranes comprise a porous separation membrane which substantially effects the separation and a coating material in occluding contact with the porous separation membrane. These multicomponent membranes are particularly attractive for gas separations in that good selectivity of separation and high flux through the membrane can be obtained.

The materials for the coating of the multicomponent membranes such as disclosed by Henis, et al, may be natural or synthetic substances, and are often polymers, and advantageously exhibit the appropriate properties to provide occluding contact with the porous separation membrane. Synthetic substances include both addition and condensation polymers. Typical of the useful materials which can comprise the coating are polymers which can be substituted or unsubstituted, and which are solid or liquid under gas separation conditions, and include synthetic rubbers; natural rubbers; relatively high molecular weight and/or high boiling liquids; organic prepolymers; poly(siloxanes) (silicone polymers); polysilazanes; polyurethanes; poly(epichlorhydrin); polyamines; polyimines; polyamides; acrylonitrile-containing copolymers such as poly($\alpha$-chloroacrylonitrile) copolymers; polyesters (including polylactams and polyarylates), e.g., poly(alkyl acrylates) and poly(alkyl methacrylates) wherein the alkyl groups have, say, 1 to about 8 carbons, polysebacates, polysuccinates, and alkyd resins; terpinoid resins; linseed oil; cellulosic polymers; polysulfones, especially aliphatic-containing polysulfones; poly(alkylene glycols) such as poly(ethylene glycol), poly(propylene glycol), etc.; poly(alkylene) polysulfates; polypyrrolidones; polymers from monomers having $\alpha$-olefinic unsaturation such as poly(olefins), e.g., poly(ethylene), poly(propylene), poly(butadiene), poly(2,3-dichlorobutadiene), poly(isoprene), poly(chloroprene), poly(styrene) including poly(styrene) copolymers, e.g., styrene-butadiene copolymer, polyvinyls such as poly(vinyl alcohols), poly(vinyl aldehydes) (e.g., poly(vinyl formal) and poly(vinyl butyral)), poly(vinyl ketones) (e.g., poly(methylvinylketone)), poly(vinyl esters) (e.g., poly(vinylbenzoate)), poly(vinyl halides) (e.g., poly(vinyl bromide)), poly(vinylidene halides), poly(vinylidene carbonate), poly(N-vinylmaleimide), etc., poly(1,5-cyclooctadiene), poly(methylisopropenylketone), fluorinated ethylene copolymer; poly(arylene oxides), e.g., poly(xylylene oxide); polycarbonates; polyphosphates, e.g., poly(ethylenemethylphosphate); and the like, and any interpolymers including block interpolymers containing repeating units from the above, and grafts and blends containing any of the foregoing. The polymers may or may not be polymerized after application to the porous separation membrane.

The non-permeating gas from the last permeator stage may be utilized in any suitable manner, e.g., used as fuel. Since the non-permeating gas is at high pressure, significant energy can be recovered from this gas by, for instance, the use of a turbine, and the like.

The invention will be further described with reference to the drawings in which:

FIG. 1 is a simplified schematic flow diagram of an ammonia synthesis plant having two permeator stages in accordance with this invention wherein the permeating gas from the first permeator stage is combined with the synthesis feed gas between compression stages for recycling to the ammonia synthesis reaction zone and the permeating gas from the second permeator stage is combined with the synthesis feed gas prior to its compression to the superatmospheric synthesis pressure.

FIG. 2 is a simplified schematic flow diagram of an ammonia synthesis plant having two permeator stages and is similar to the plant depicted in FIG. 1 except that the permeating gas from the second permeator stage is compressed and combined with the permeating gas to be recycled to the ammonia synthesis reaction zone.

FIG. 3 is a simplified schematic flow diagram of an ammonia synthesis plant having two permeator stages in accordance with this invention wherein ammonia is removed from the ammonia synthesis loop prior to the removal of the purge stream. The permeating gas from the first permeator stage contains ammonia and is combined with dry synthesis feed gas between compressor stages. The non-permeating gas from the first permeator stage is passed through a scrubber to remove ammonia and then to the second permeator stage from which permeator stage the permeating gas is combined with the synthesis feed gas prior to its compression to the superatmospheric synthesis pressure.

Figure 1:
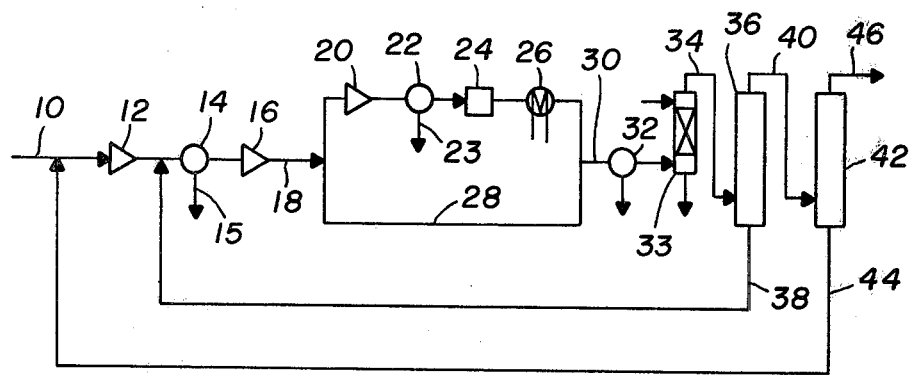

In FIGS. 1 and 2 and 3 and 4, like reference numerals indicate like features.

With reference to FIG. 1, a synthesis feed gas comprising hydrogen and nitrogen in approximately a 3:1 mole ratio is introduced via line 10 into the ammonia synthesis system. The synthesis feed gas is compressed in several stages to superatmospheric ammonia synthesis pressures. As depicted, compressor 12 partially elevates the pressure of the synthesis feed gas toward the superatmospheric synthesis pressure. The partially compressed feed gas is chilled in coalescer 14 to condense and remove (via line 15) water vapor from the synthesis feed gas. The thusly dried synthesis feed gas is passed to compressor 16 where it is compressed to above the superatmospheric pressure in the ammonia synthesis loop. It is to be realized that one or both of compressors 12 and 16 may be comprised of two or more compressor stages.

The effluent from compressor 16 is transported via conduit 18 to the ammonia synthesis loop. The conventional synthesis loop is depicted in that the synthesis feed gas passes through recycle compressor 20 and ammonia coalescer 22 from which product ammonia is withdrawn via line 23 before entering ammonia synthesis reaction zone 24 for conversion to ammonia. Positioning coalescer 22 prior to the ammonia synthesis reaction zone 24 insures that any water vapor which may be present in the reactor feed gas is reduced to provide less than about 10 ppmv total oxygen-containing compounds in the reactor feed gas. The reaction effluent from the ammonia synthesis reaction zone is cooled in heat exchanger 26 to a temperature in the range of about 0° to 100° C. The heat transfer medium in heat exchanger 26 may be the reactor feed gas from ammonia coalescer 22 which in turn is heated to a suitable temperature for introduction into the ammonia synthesis reaction zone. The effluent from heat exchanger 26 is recycled via line 28 (ammonia synthesis loop) to the recycle compressor 20.

A purge stream is withdrawn from line 28 via line 30. The volume of the purge stream is sufficient to maintain an acceptable level of inert contaminants in the ammonia synthesis loop and ammonia synthesis reaction zone. As depicted, the purge stream is removed prior to the condensation of the ammonia product from the gases in the ammonia synthesis loop. Thus, the purge stream contains substantial quantities of ammonia. As depicted in FIG. 1 ammonia is removed from the purge stream by passing the purge stream through chiller-coalescer 32 which removes ammonia by condensation followed by water scrubber 33 which absorbs ammonia and generally provides a gas containing less than about 0.1 volume percent ammonia. The purge stream may, if necessary, be subjected to heat exchange to provide a temperature of, say, about 25° to 40° C. The purge stream is passed via line 34 to first permeator 36.

Figure 5:
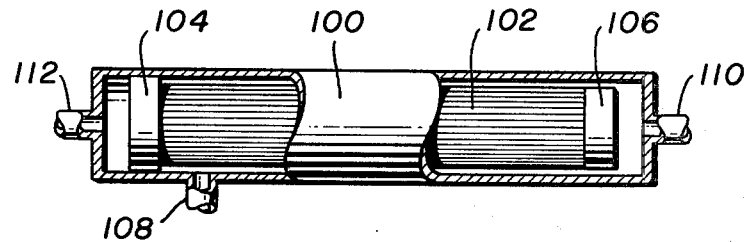
FIG. 5 is a schematic cross-section of a hollow fiber membrane-containing permeator which may be employed in an ammonia synthesis plant in accordance with this invention.

A schematic cross-section of an axially, shell-side fed permeator such as may be employed in the system of FIG. 1 is provided in FIG. 5. With reference to FIG. 5, within casing 100 is positioned a plurality of hollow fiber membranes which are arranged in bundle generally designated by the numeral 102. One end of the bundle is embedded in header 104 such that the bores of the hollow fibers communicate through the header. The header is positioned in casing 100 such that essentially the only fluid communication through the header is through the bores of the hollow fibers. The opposite ends of the hollow fibers are sealed in end seal 106. The purge stream enters the casing through feed port 108, disperses within bundle 102 and passes to shell exit port 110 positioned at the opposite end of the casing. Hydrogen permeates to the bores of the hollow fibers, and passes via the bores through header 104. The permeating gas exits casing 100 through permeate exit port 112. While FIG. 5 depicts a hollow fiber membrane-containing permeator in which only one end of the hollow fibers is open, it is apparent that both ends of the hollow fibers can be open.

With reference to FIG. 1, a first permeating gas, i.e., a hydrogen-rich stream, exits permeator 36 via line 38. The pressure drop across the membrane is such that the permeating gas is at a pressure substantially the same as the pressure of the synthesis feed gas exiting compressor 12, and the first permeating gas is combined with the synthesis feed gas exiting compressor 12 in order to be recycled to ammonia synthesis reaction zone 24. The first permeating gas is introduced into the synthesis feed gas upstream of coalescer 14 such that water vapor which is introduced into the purge stream in scrubber 33 and permeated through the separation membrane, can be removed.

The non-permeating gas is withdrawn from the feed side of first permeator 36 and is passed via line 40 to permeator 42. The non-permeating gas contains hydrogen as well as nitrogen, methane and argon. A second permeating gas exits second permeator 42 via line 44. The second permeating gas is at a pressure substantially the same as the pressure of the synthesis feed gas entering compressor 12, and the second permeating gas is combined with the synthesis feed gas entering compressor 12 to be recycled to ammonia synthesis reaction zone 24. The non-permeating gas from the second permeator exits via line 46 and can be treated in an additional permeator (not depicted), exhausted to the environment, or used, for instance, as a fuel.

Figure 2:
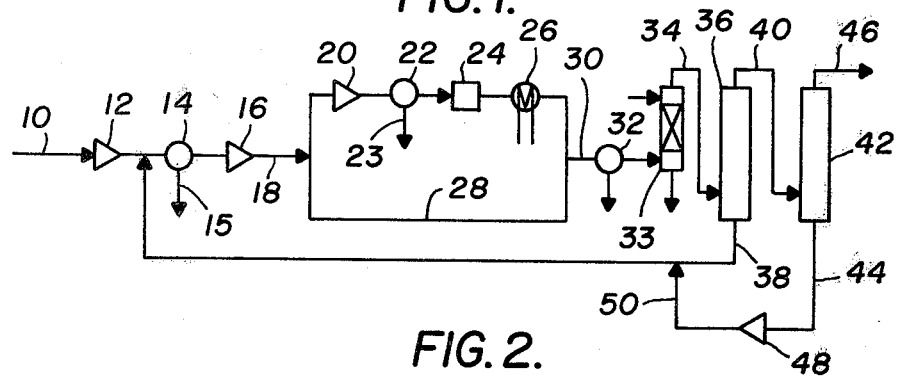

The ammonia synthesis system of FIG. 2 is substantially the same as the system depicted in FIG. 1 except that the second permeating gas from second permeator 42 is compressed in compressor 48 to a total pressure slightly above the pressure of the first permeating gas in line 38. The compressed second permeating gas is passed via line 50 to line 38 whereat it is combined with the first permeating gas being recycled to ammonia synthesis reaction zone 24. This method may find application when retrofitting separation membrane hydrogen recovery systems in existing ammonia plants in order to utilize a process of this invention. For instance, if increased ammonia production is desired in an ammonia plant, but compressor 12 is at its maximum capacity, this bottleneck can be obviated by utilizing a compressor to increase the pressure of the second permeating gas such that it can be introduced into the synthesis feed gas without increasing the load compressor 12. Also, the difference between the pressure on the feed side of second permeator 42 and the feed side of compressor 12, in some ammonia plants, may be too great to be withstood by a membrane which may be employed. Accordingly, a lesser pressure drop can be utilized across the membrane in the second permeator while maintaining the feed side of the second permeator at elevated pressures. In view of the use of high pressures on the feed side of the second permeator, little compression is required to elevate the pressure of the second permeating gas for introduction into the ammonia synthesis system.

Figure 3:
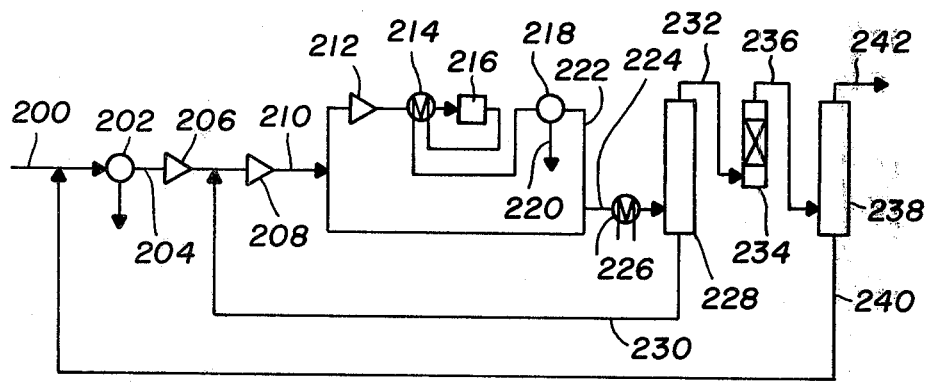

In the ammonia synthesis system depicted in FIG. 3 the purge stream is withdrawn from the ammonia synthesis loop downstrean of the ammonia removal and upstream of the introduction of the fresh synthesis feed gas into the synthesis loop.

A synthesis feed gas comprising hydrogen and nitrogen is introduced via line 200 into the ammonia synthesis system. The synthesis feed gas contains moisture and is therefore fed into adsorber 202 in which essentially all the water contained in the synthesis feed gas is removed such that the total oxygen-containing content of the synthesis feed gas is less than about 10 ppmv. The thusly dried gas is transported through the line 204 to compressor 206 in which the synthesis feed gas is partially compressed to substantially the superatmospheric synthesis pressure. The partially compressed synthesis feed gas is compressed to above the superatmospheric pressure in the ammonia synthesis loop in compressor 208. Each of compressors 206 and 208 can be a multistage compressor. The effluent from compressor 208 is passed via line 210 into the ammonia synthesis loop where the synthesis feed gas is combined with the gas circulating in the synthesis loop to provide the reactor feed gas. The reactor feed gas is compressed in recycle compressor 212, heated in heat exchanger 214, and introduced into ammonia synthesis reaction zone 216. A reaction effluent from the ammonia synthesis reaction zone is used as the exchange medium in heat exchanger 214 and is cooled. The reaction effluent then passed to ammonia coalescer 218 from which product ammonia is withdrawn via line 220. Since the fresh synthesis feed gas has not been combined with the reaction effluent, a lesser weight of gas needs to be refrigerated to condense the ammonia. The overhead from ammonia coalescer 218 is recirculated in conduit 222 (ammonia synthesis loop) to ammonia synthesis reaction zone 216. Since the ammonia is removed from the synthesis loop prior to recompression in recycle compressor 212, less energy is expended in recirculating the gas in the synthesis loop.

A purge stream is withdrawn from the synthesis loop via line 224. Since the purge stream is at a low temperature because of the cooling to condense the ammonia product, the purge stream is heated in heat exchanger 226 to suitable temperatures for effecting the separation of hydrogen and ammonia, e.g., about 25° to 40° C. The warmed purge stream is passed to first permeator 228.

First permeator 228 may be of any suitable design including the design of the separator depicted in FIG. 5. The permeating gas exits permeator 228 via line 230 at substantially the pressure of the effluent from compressor 206. The permeating gas passes to and is combined with the synthesis feed gas exiting compressor 206 in order to be recycled to ammonia synthesis reaction zone 216. Since the synthesis feed gas has been dried, the presence of ammonia due to permeation through the separation membrane can be tolerated in the synthesis feed gas to be compressed.

The non-permeating gas from first permeator 228 is passed via line 232 to water scrubber 234 to remove ammonia. Since a significant amount of the hydrogen has been separated from the purge stream in permeator 228, the water scrubber can be of less volume than would be necessary if the scrubber were positioned upstream of the first permeator. The non-permeating gas having ammonia removed is passed through line 236 to second permeator 238. A second permeating gas is obtained from second permeator 238 at a pressure substantially the same as the pressure of the synthesis feed gas in line 200. The second permeating gas is passed through line 240 to line 200 whereat it is combined with the synthesis feed gas in order to be recycled to ammonia synthesis reaction zone 216. Since the second permeating gas may contain water vapor from water scrubber 234, it is added to the synthesis feed gas prior to the synthesis feed gas being dried in adborber 202. The non-permeating gas from second permeator 238 exits via line 242.

Figure 4:
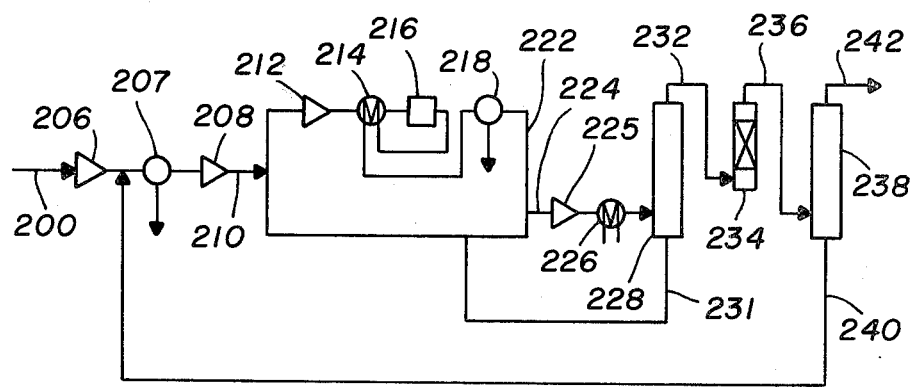
FIG. 4 is a simplified schematic flow diagram of an ammonia synthesis plant having two permeator stages and is similar to the plant depicted in FIG. 3 except that the purge stream is compressed prior to being passed to the first permeator stage and the permeating gas from the first permeator stage is directly introduced into the ammonia synthesis loop.

The ammonia synthesis system of FIG. 4 is substantially the same as the system depicted in FIG. 3 except that the purge stream in line 224 is compressed in compressor 225 to sufficiently elevated pressures that the first permeating gas is at a pressure suitable for being directly introduced back into the ammonia synthesis loop via line 231. Also, the second permeating gas from second permeator 238 can be at a higher total pressure than the second permeating gas in the ammonia stream depicted in FIG. 3 even though the total pressure differentials are essentially the same. Accordingly, in the system of FIG. 4, the second permeating gas is combined with the synthesis feed gas downstream of compressor 206. Instead of adsorber 202 as in the system of FIG. 3, coalescer 207 is provided between compressors 206 and 208 in order to remove water vapor from the combined synthesis feed gas and second permeating gas.

The following example is provided in illustration of a process in accordance with this invention. All parts and percentages are by volume unless otherwise noted.

Ammonia is synthesized from nitrogen and hydrogen employing an ammonia synthesis plant similar to that depicted in FIG. 1. The hydrogen feedstock is obtained by primary reforming of natural gas and the synthesis feed gas is obtained by introducing air and the primary reformer effluent into a secondary reformer. The effluent from the secondary reformer is treated in a shift converter, a carbon dioxide absorber and a methanator to provide approximately 52,000 kilograms per hour of a synthesis feed gas containing about 25.7 mole percent nitrogen, 73.1 mole percent hydrogen, 0.6 mole percent methane, 0.4 mole percent argon, and 0.2 mole percent water. The synthesis feed gas is obtained at about 28 atmospheres absolute and 50° C. The synthesis feed gas is compressed to about 70 atmospheres absolute, cooled to about 8° C. to condense water. The synthesis dried feed gas is further compressed to about 133 atmospheres absolute and is introduced into and combined with the gas in the ammonia synthesis loop. In the ammonia synthesis loop the combined gases are compressed an additional 6 or 7 atmospheres and are treated in an ammonia coalescer which removes about 44,500 kilograms of ammonia per hour. The gases are heated to about 135° to 140° C. Approximately 310,000 kilograms per hour of gas comprising about 66.5 mole percent hydrogen, 22 mole percent nitrogen, 6.8 mole percent methane, 3.5 mole percent argon, and 1.2 mole percent ammonia are introduced into a Kellogg-type ammonia synthesis converter utilizing a promoted iron ammonia synthesis catalyst. A reaction effluent gas at a temperature at about 280° C. is obtained from the synthesis converter and contains about 11.4 percent ammonia. The effluent is cooled to about 43° C. A purge stream of about 2.1 percent of the gases in the synthesis loop is removed, and the remaining gases are returned to the synthesis loop compressor.

The purge stream is chilled to about $-23°$ C. and about 1000 kilograms per hour of liquid ammonia are condensed and removed from the purge stream. The purge stream contains about 1.2 volume percent ammonia. The purge stream is then scrubbed with water at about 25° C. at a water rate of about 2000 kilograms per hour. The purge stream contains less than about 100 ppmv ammonia.

The purge stream is heated to about 30° C. and then passed to the first permeator which consists of 25 hollow fiber membrane-containing permeators in parallel. The permeators are similar to that depicted in FIG. 5 and each permeator contains about 93 square meters of effective surface area. The membranes are comprised of anisotropic polysulfone substantially prepared in accordance with the method disclosed in Example 64 of the Henis, et al, U.S. patent application except that the spinning solution contains about 30 weight percent solids; the spinning jet dimensions are about 458 microns outside diameter, 127 microns inside diameter, and 76 microns diameter injection bore; the injection fluid is a mixture of 60 volume percent dimethylacetamide in water. The last godet bath is at a temperature of about 50° C.; and the fibers are washed for 24 hours with no subsequent storage in water. Appropriate polymer solution and injection fluid rates are employed such that the dimensions of the hollow fibers are about 450 microns outside diameter and about 120 microns inside diameter. The permeator exhibits a separation factor of hydrogen over methane of about 30 and a permeability of about $50 \times 10^{-6}$ cubic centimeters of hydrogen per square centimeter of surface area per second per centimeter of mercury pressure drop. A pressure drop of about 65 atmospheres is maintained across the membrane, and approximately 1100 kilograms per hour of a first permeating gas is obtained from the bore side of the first permeator stage. The first permeating gas comprises 90.3 volume percent hydrogen, 6.2 volume percent nitrogen, 2.4 volume percent methane, and 1.2 volume percent argon. The first permeating gas is introduced into the feed gas exiting the first compressor prior to the condensation of water from the combined synthesis feed gas and first permeating gas stream.

The non-permeating gas from the first permeator stage is at a pressure of about 136 atmospheres absolute and contains about 43.8 volume percent hydrogen, 35.4 volume percent nitrogen, 13.7 volume percent methane, and 7.1 volume percent argon. This non-permeating gas enters the second permeator stage comprising 7 permeators (as described above) in parallel. About 496 kilograms per hour of a second permeating gas is obtained from the bore side of the second permeator stage which is at a pressure of about 30 atmospheres absolute and comprises 88 volume percent hydrogen, 7.4 volume percent nitrogen, 1.5 volume percent argon, and 2.4 volume percent methane. The non-permeating gas from the second permeator stage is at a pressure of about 136 atmospheres absolute and contains about 24.2 volume percent hydrogen, 47.7 volume percent nitrogen, 18.5 volume percent methane, and 9.6 volume percent argon. About 86.3 percent of the hydrogen in the purge stream is recycled to the ammonia synthesis reaction zone.

It is claimed:

1. In a process for synthesizing ammonia from hydrogen and nitrogen comprising introducing a synthesis feed gas comprising nitrogen, hydrogen and at least one of methane and argon as an inert contaminant at substantially a superatmospheric synthesis pressure into an ammonia synthesis loop, reacting hydrogen and nitrogen in the ammonia synthesis loop at a superatmospheric synthesis pressure to produce ammonia in an ammonia synthesis reaction zone, removing ammonia from the ammonia synthesis loop, and removing a purge stream from the ammonia synthesis loop in an amount sufficient to maintain the concentration of inert contaminants less than about 25 percent wherein the purge stream is passed to a permeator comprising a separation membrane having a feed side and a permeate exit side and exhibiting selectivity to the permeability of hydrogen as compared to the permeability of each of methane and argon, a permeating gas is recovered at the permeate exit side of the separation membrane and is recycled to the ammonia synthesis reaction zone, the improvement wherein the permeator comprises at least two permeator stages in series, each permeator stage having a feed side and a permeate exit side in which the permeate exit side is at a lower total pressure than the total pressure on the feed side, wherein between permeator stages, the non-permeating gas from the feed side of one permeator stage is passed to the feed side of the next permeator stage; wherein at least one permeator stage has a lower ratio of total pressure on the feed side to total pressure on the permeate exit side than the ratio of total pressure on the feed side to total pressure on the permeate exit side of at least one subsequent permeator stage; and wherein the permeating gas from at least one permeator stage is recycled to the ammonia synthesis reaction zone.

2. The process of claim 1 wherein the permeating gas from at least one permeator stage having a lower ratio of total pressure on the feed side to total pressure on the permeate exit side and the permeating gas from at least one permeator stage having a higher ratio of total pressure on the feed side to total pressure on the permeate exit side are recycled to the ammonia synthesis reaction zone.

3. The process of claim 2 wherein the permeating gas from at least one permeator stage is combined with the synthesis feed gas at a point where the permeating gas from said permeator stage is at a slightly higher pressure than the synthesis feed gas.

4. The process of claim 3 wherein the synthesis feed gas is compressed in at least two stages to said superatmospheric synthesis pressure and the permeating gas from said at least one permeator stage having a lower ratio of total pressure on the feed side to total pressure on the permeate exit side is introduced into said synthesis feed gas between two of the compression stages.

5. The process of claim 4 wherein the permeating gas from said at least one permeator stage having a higher ratio of total pressure on the feed side of total pressure on the permeate exit side is introduced into said synthesis feed gas at a point where the permeating gas is at a slightly higher pressure than the synthesis feed gas, which point is prior to the introduction of the permeating gas from the at least one permeator stage having a lower ratio of total pressure on the feed side to total pressure on the permeate exit side, and at least one compressor stage is between the point where the permeating gas from said at least one permeator stage having a higher ratio is introduced into the synthesis feed gas and the point where the permeating gas from the at least one permeator stage having a lower pressure ratio is introduced.

6. The process of claim 4 wherein the purge stream passed to said at least one permeator stage having a lower ratio of total pressure on the feed side to total pressure on the permeate exit side is at a total pressure of at least substantially said superatmospheric synthesis pressure.

7. The process of claim 1 or 6 wherein the total pressure differential across the at least one permeator stage having a low ratio of total pressure on the feed side to total pressure on the permeate exit side is at least about 20 atmospheres.

8. The process of claim 1 or 6 wherein the total pressure differential across the at least one permeator stage having a higher ratio of total pressure on the feed side to total pressure on the permeate exit side is at least about 20 atmospheres.

9. The process of claim 1 or 8 wherein the permeating gas from the at least one permeator stage having a higher ratio of total pressure on the feed side to total pressure on the permeate exit side is at a lower total pressure than the permeating gas from the at least one permeator stage having a lower ratio of total pressure on the feed side to total pressure on the permeate exit side.

10. The process of claim 1 wherein the at least one permeator stage having a lower ratio of total pressure on the feed side to total pressure on the permeate exit side is operated predominantly on a flux-limiting basis.

11. The process of claim 10 wherein the percent of difference in hydrogen partial pressures between the purge gas passed to said permeator stage and the non-permeating gas from said permeator stage divided by the difference between the hydrogen partial pressure of the purge gas passed to said permeator stage and the minimum hydrogen partial pressure on the permeate exit side of said permeator stage is about 20 to 90.

12. The process of claim 1 or 10 wherein at least about 20 percent of the hydrogen in the purge stream permeates to the permeate exit side of the at least one permeator stage having a lower ratio of total pressure on the feed side to total pressure on the permeate exit side.

13. The process of claim 1, 5 or 10 wherein the last permeator stage is said permeator stage having a higher ratio of total pressure on the feed side to total pressure on the permeate exit side.

14. The process of claim 1, 5 or 10 wherein the amount of hydrogen in the permeating gas from the at least one permeator stage having a higher ratio of total pressure on the feed side to total pressure on the permeate exit side is at least about 10 percent of the hydrogen in the purge stream.

15. The process of claim 1, 2 or 5 wherein ammonia is removed from the purge stream prior to at least one permeator stage to provide a purge stream containing less than about 0.5 volume percent ammonia.

16. The process of claim 15 wherein ammonia is removed prior to the first permeator stage.

17. The process of claim 15 wherein ammonia is removed between two permeator stages.

* * * * *